United States Patent [19]

Magill

[11] 4,305,686

[45] Dec. 15, 1981

[54] OFFSHORE DRILLING PLATFORM PROTECTION DEVICE

[75] Inventor: James M. Magill, Houston, Tex.

[73] Assignee: Atwood Oceanics, Inc., Houston, Tex.

[21] Appl. No.: 101,135

[22] Filed: Dec. 7, 1979

[51] Int. Cl.³ .......................................... E02B 17/08
[52] U.S. Cl. ................................. 405/198; 74/606 R
[58] Field of Search .............................. 405/195–200; 254/105–112; 74/609, 606; 175/5–10

[56] References Cited

U.S. PATENT DOCUMENTS

| | | | |
|---|---|---|---|
| 1,075,808 | 10/1913 | Bales | 74/609 |
| 1,292,265 | 1/1919 | Cramer | 74/609 |
| 1,325,206 | 12/1919 | Raybon | 74/609 |
| 2,912,882 | 11/1959 | Wilson | 74/606 X |
| 3,044,269 | 7/1962 | Tourneau | 405/198 |
| 3,153,941 | 10/1964 | Christian | 74/606 X |
| 3,454,868 | 7/1969 | Gibson et al. | 74/606 |
| 3,851,482 | 12/1974 | LeTourneau et al. | 405/197 |

*Primary Examiner*—Dennis L. Taylor
*Attorney, Agent, or Firm*—Pravel, Gambrell, Hewitt, Kirk, Kimball & Dodge

[57] ABSTRACT

An offshore drilling platform protection device for use on an offshore oil well drilling vessel including a drilling platform supportable on a plurality of extendable legs wherein each leg is moved by a rack gear assembly, which rack gear assembly includes an otherwise exposed first gear which engages a second gear positioned in a housing having a rectangular corner opening through which the first gear extends, the protection device including first and second protective sections adapted for mounting over the first gear adjacent to the rectangular corner of the housing for the second gear, the first and second protective sections cooperating to provide an L-shaped opening which communicates with the opening at the second gear housing for protecting the first gear while allowing the first gear to mesh with the second gear.

9 Claims, 7 Drawing Figures

OFFSHORE DRILLING PLATFORM PROTECTION DEVICE

TECHNICAL FIELD OF THE INVENTION

This invention relates to offshore drilling vessels and in particular to gear assemblies for extending the legs which support a drilling platform for such vessel and to a protective device for covering one of the otherwise exposed gears of the gear assembly.

One type of offshore oil well drilling vessel includes a platform having a plurality of extendable legs, this type of drilling vessel sometimes being called a jack-up oil well drilling platform. Typically, such an oil well drilling vessel is floated offshore to the drilling site and then the extendable legs are moved downwardly through the platform into engagement with the bottom and thereafter, the platform is moved or "jacked" up the legs to a position above the water line. One type of actuating mechanism for jacking these support legs includes a rack gear assembly mounted with the platform for engaging a rack gear mounted on the legs for moving the legs up and down with respect to the platform. Naturally, it is necessary to utilize a number of gears to provide proper gear reduction between the actuation motors and the actual gears which engage the rack mounted on the legs in order to jack the legs up and down. The largest gear in such a rack gear assembly is commonly referred to as a "bull" gear. Typically, in many oil well drilling platforms utilizing this type of leg actuation mechanism, the bull gear is exposed to the elements. Whenever it is necessary to rotate the bull gear and thus cause the bull gear to mesh with another gear, it has been necessary to freshly lubricate the exposed gear. On some drilling platforms, there may be as many as ten or more bull gears which need to be lubricated each time the legs are extended and retracted. This lubrication is essential; and therefore, critical manpower is used lubricating the bull gears whenever it is necessary to move the legs.

SUMMARY OF THE INVENTION

It is an object of this invention to provide a protective device for use in a rack gear assembly on an offshore oil well drilling vessel to provide needed protection and continuous lubrication for such large gears as the bull gear thus eliminating the need for additional lubrication of the gear whenever it is used. This object is accomplished by providing the protective device of this invention, which includes first and second protective sections adapted for mounting over the first or bull gear, which is positioned in engagement with a second gear already in a rectangular housing, the first gear extending through a corner opening in the second gear rectangular housing. The first and second protective sections of the protective device of this invention cooperate to provide an opening adapted for alignment with the opening in the housing for the second gear at a rectangular corner of that housing so that the first gear may be protected from the elements and provided with a continuous reservoir of lubrication while allowing the first gear to extend into meshing engagement with the second gear within the second gear housing.

The first protective section of the preferred embodiment of this invention is generally semi-circular in configuration and includes front and rear walls connected by a first arcuate rim to form a generally semi-circular configuration. The front and rear walls and the first rim of the first protective section each have an edge portion cooperating to form a first part of the opening for the device.

The second protective section is also generally semi-circular in configuration and includes front and rear walls connected by a second arcuate rim to form a generally semi-circular configuration. Connection means are provided for connecting together these first and second protective sections about the first gear. The front and rear walls and the second rim of the second protective section have edge portions which cooperate to provide a second part of the device opening. The first and second protective section openings cooperate to provide an L-shaped opening adapted for alignment with the opening in the housing for the second gear in order to provide protection to the first gear while allowing the first gear to be in meshing engagement with the second gear located in the second gear housing.

These features and other features of the protective device of the preferred embodiment of this invention will be described in detail in the Description of the Preferred Embodiment to follow, with the claims following the Description of the Preferred Embodiment setting forth the subject matter for which patent protection is sought.

DESCRIPTION OF THE PREFERRED EMBODIMENT

Figure 1:
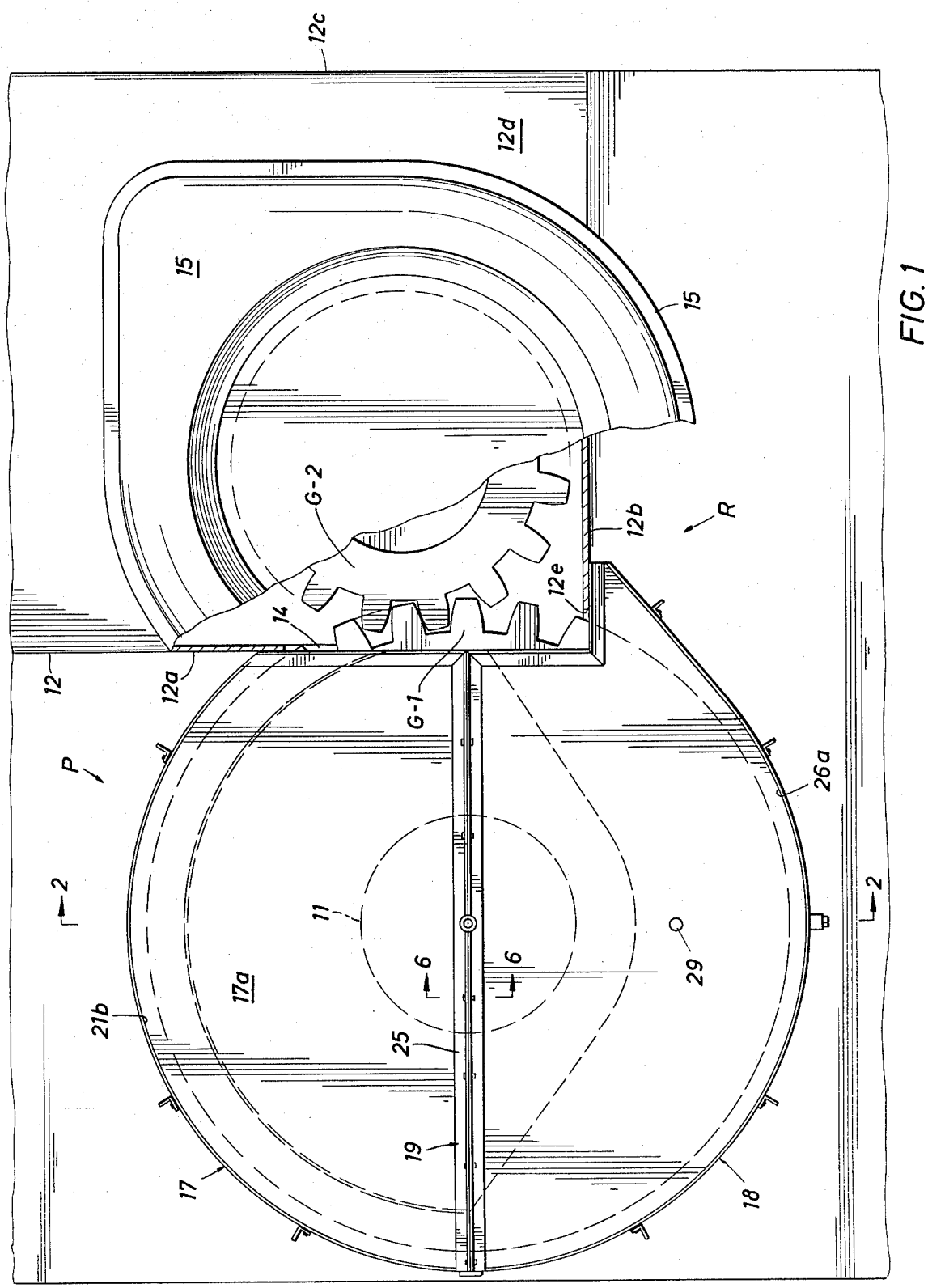
FIG. 1 is a front view of a part of the rack assembly of an offshore drilling vessel illustrating the protective device of the preferred embodiment of this invention in use.

Referring to the drawings, the letter P generally designates the protective device of the preferred embodiment of this invention. The protective device P is designed for specific use on an offshore oil well drilling vessel such as a jack-up vessel which includes a drilling platform supportable on a plurality of extendable legs. In one type of offshore oil well drilling platform of the jack-up variety, the extendable legs are jacked up and down by means of a rack gear assembly which inclues a number of actuation gears mounted on the drilling platform for engagement with a rack gear mounted on the extendable leg. Part of such a rack gear assembly, generally designated by the letter R, is illustrated in FIGs. 1 and 2.

Figure 2:
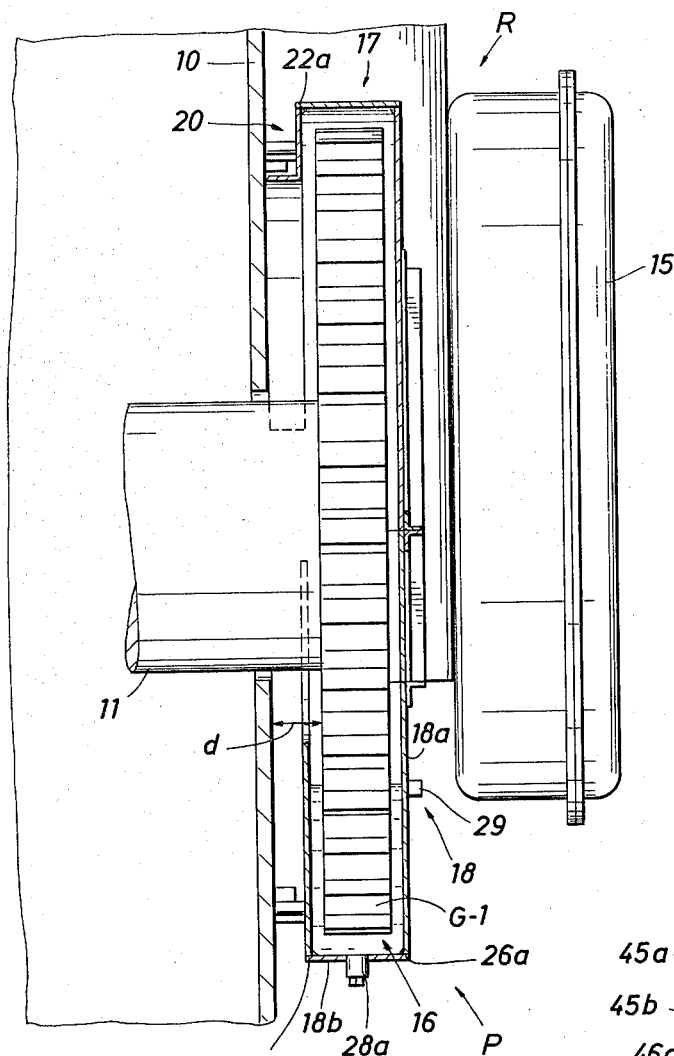
FIG. 2 is a side view of the protective device taken in section along line 2—2 of FIG. 1.
Figure 4:
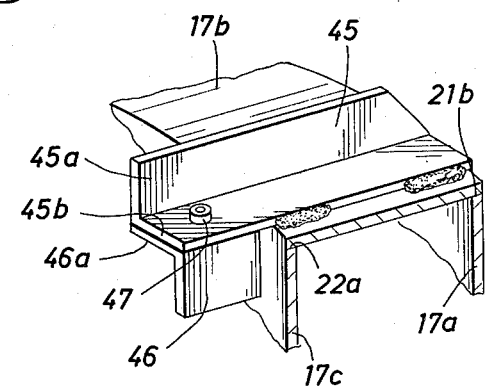
FIG. 4 is an isometric view, partly in section, of a set of the connector elements of the mount means for mounting the protective device.
Figure 3:
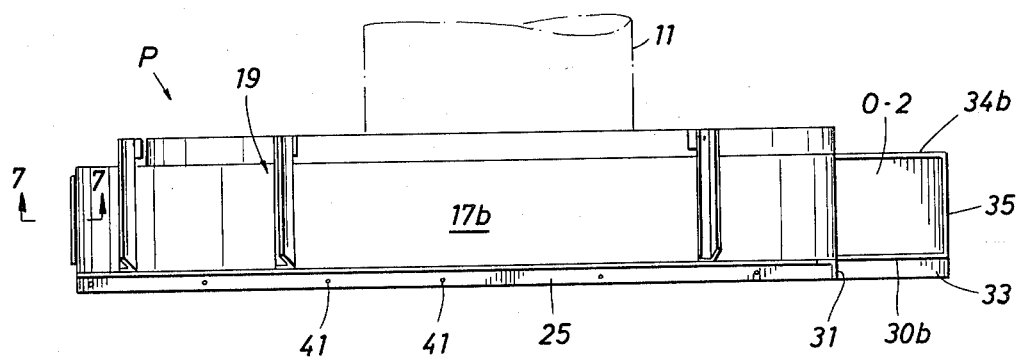
FIG. 3 is a top view of the protective device of FIG. 1.
Figure 5:
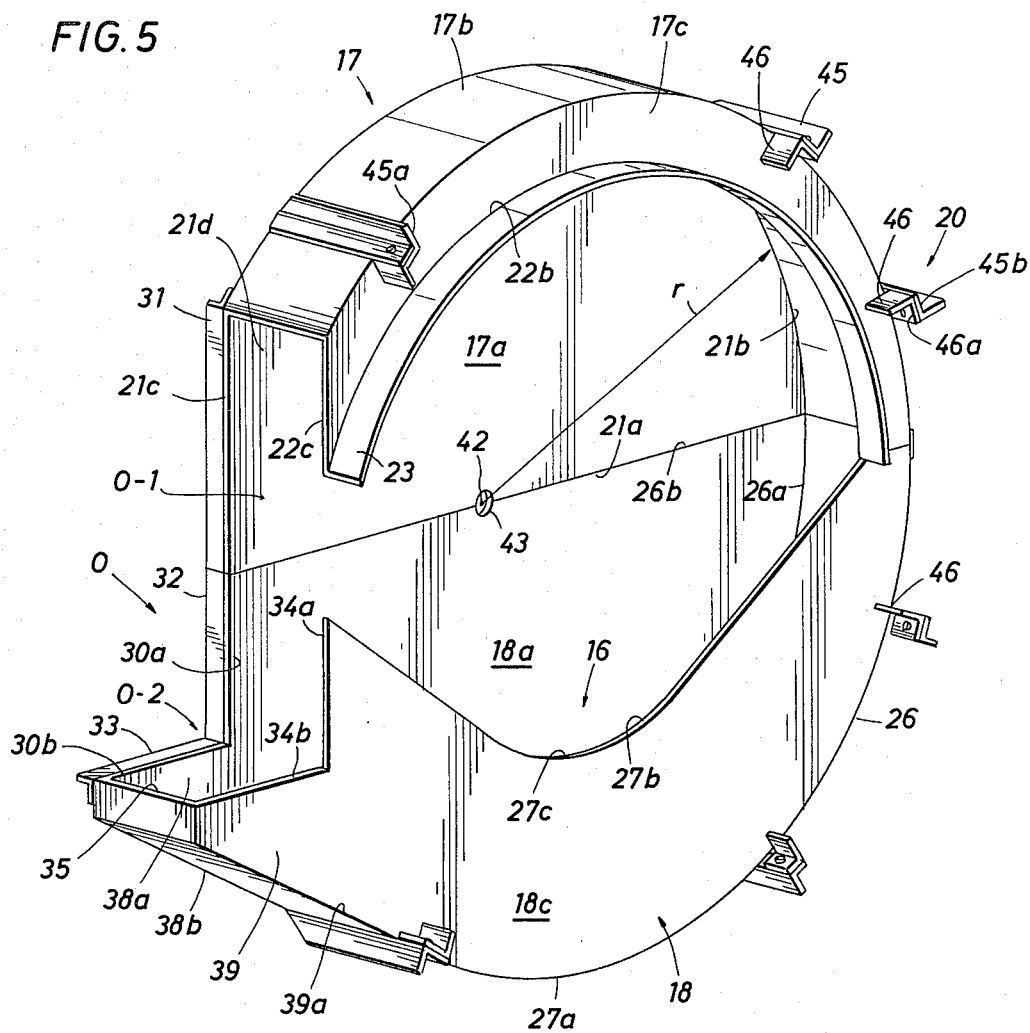
FIG. 5 is a rear, isometric view of the protective device connected together.

The rack gear assembly R as illustrated in FIGS. 1 and 2 includes a back wall or motor housing wall 10 having shaft 11 extending therethrough with a main or "bull" gear G-1 mounted on the shaft 11 for rotation. The shaft 11 may be connected to a motor drive (not shown). The bull gear, referred to herein as a first gear, G-1 is defined as being positioned a distance d away from the motor housing or back wall 10. The rack gear assembly R further includes a second gear G-2 smaller in overall diameter than the gear G-1, positioned in a rectangular housing 12 also mounted on the motor housing wall 10. The rectangular housing 12 is a principally enclosed housing which includes side walls 12a, 12b and 12c (the top wall not being shown) and a front wall 12d which cooperates with the motor housing wall 10 to provide a substantially enclosed housing for the second gear G-2. The second gear G-2 is mounted on a shaft (not shown). The second gear housing 12 is provided with a corner opening 14, which is defined as being L-shaped, formed by a recess partly in wall 12a and partly in wall 12b, which opening 14 allows for positioning of a part of the first gear G-1 in meshing engagement with the second gear G-2 in the second gear housing 12. The L-shaped opening 14 is therefore formed at a rectangular corner of the generally rectangular second gear housing 12 and allows for the rotation or travel of the gear teeth on the perimeter of the first gear G-1 through the opening 14 so that the gears G-1 and G-2 are in meshed engagement. In the rack gear assembly R, additional gears (not shown) may be mounted within the cover 15, which s positioned outside of and mounted onto the front wall 12d of the second gear housing 12.

Generally, the protective device P is provided for protecting the otherwise exposed first gear G-1 while allowing a portion of this gear to mesh with the second, housed gear G-2 within the second gear housing 12 and further, the protective device P provides a continuous lubricating reservoir generally designated as 16 for continuously lubricating the gear teeth of the gear G-1. The protective device P includes first and second protective sections 17 and 18 which are connected together by connection means generally designated as 19 in position over the first gear G-1 and which are attached to the motor housing wall 10 by a mount means generally designated as 20.

The first protective section 17 is generally semi-circular in configuration when viewed from the front and includes a semi-circular front wall 17a, an arcuate first outer rim 17b and a semi-annular gear wall 17c. The semi-circular front wall 17a includes a straight bottom or diagonal edge 21a and a generally semi-circular outer edge 21b. The first rim 17b, which is also semi-circular in curvature, is welded or otherwise attached to the outer semi-circular edge 21b of the front wall. The width of the first rim 17b is greater than the width or thickness of the gear G-1. The generally semi-annular rear wall 17c includes a generally semi-circular outer edge 22a welded or otherwise attached to the other edge of the first rim portion 17b and an inner edge 22b, to which is attached a spacer rim portion 23 which extends rearwardly and is adapted to actually engage the motor housing wall 10.

The front wall 17a, first outer rim 17b and rear wall 17c cooperate to provide a first opening portion 0-1 of a generally L-shaped opening generally designated as 0. The first opening portion 0-1 of the opening 0 is formed by the chord-like edge 21c machined vertically and at a right angle with respect to diagonal front wall edge 21a, which is shown horizontal. The first rim 17b terminates in a transverse edge 21d aligned with the vertical, chord-like edge 21c of the first wall. And, the first part of the opening 0-1 is further formed by the vertical edge 22c of the annular, rear wall 17c. The edges 21c, 21d and 22c are aligned in a vertical plane to provide the first part 0-1 of the generally L-shaped opening 0.

Figure 7:
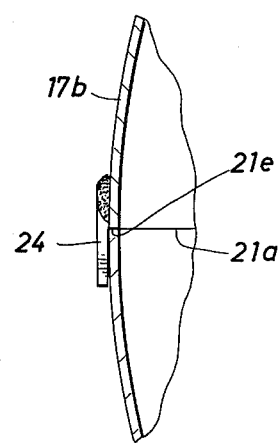
FIG. 7 is a side view of an alignment member for aligning the connection of the second cover section to the first cover section.

Referring to FIG. 7, an alignment member 24 is welded onto the bottom portion of the first rim 17b for assisting in the alignment of the second protective section 18 with the first protective section 17 during assembly. The first rim 17b terminates in a bottom edge 21e which is aligned with the diagonal bottom edge 21a of the front wall 17a. The alignment member 24 is welded in a position to extend downwardly below bottom rim edge 21e in position to engage the rim portion of the second protective section 18N.

Figure 6:
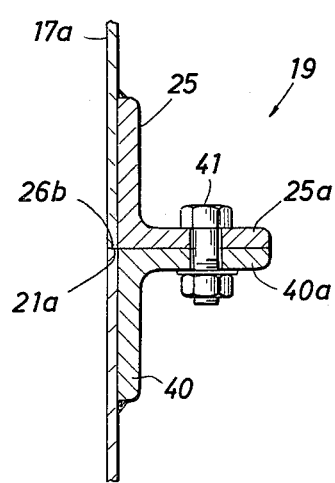
FIG. 6 is a sectional view taken along lines 6—6 of FIG. 1 of the connection means for connecting together the first and second protective sections of the protective device.

Referring to FIGS. 1 and 6, the connection means generally designated as 19 includes a horizontally extending angle member 25 which is welded onto the bottom part of the front wall 17a in position such that flange portion 25a of the angle member 25 is aligned with and extends outwardly from bottom diagonal front wall edge 21a.

The second or bottom protective section 18 includes a generally semi-circular front wall 18a, a second rim 18b and a generally annular rear wall 18c, which rear wall is on a plane parellel to the plane of the front wall. The front wall 18a, second rim 18b and rear wall 18c cooperate to provide the reservoir 16 and further to provide the second part 0-2 of the generally L-shaped opening 0, which is formed when the first and second protective sections 17 and 18 are connected together about the gear G-1.

The generally semi-circular front wall 18a includes a generally semi-circular outer edge 26a and a diagonal, straight edge 26b. The outer, generally circular edge 26a of the front wall 18a is welded or otherwise attached to the second outer rim 18b which has a width equal to that of the first rim portion and is thus wider than the width or thickness of the first gear G-1. The rear wall 18c includes a generally semi-circular outer edge 27a having the same radius as the outer edge 26a of the front wall 18a, the outer edge 27a being welded or otherwise attached to the second rim portion 18b. The generally annular rear wall 18c further includes an arcuate inner edge 27b which is generally curved such that the lowest point, or apex of the curve, located at 27c, is approximately below the common center point for the radii (to be further discussed, infra) which generate the generally semi-circular outer wall edges 26a and 27a. The rear wall 18c cooperates with the second rim portion 18b and front wall 18a to provide the reservoir generally designated as 16 which may house a lubrication fluid such as grease of sufficient depth to immerse the gear tooth portion of the gear G-1 during a bottom arc of the rotation of the gear G-1. A drain plug 28 is mounted in the second rim 18b to allow for the draining of the lubricating fluid such as grease whenever necessary. Further, a entry valve 29 is mounted in the front wall portion at a height generally aligned with the bottom apex 27c of the inner rear wall edge 27b to allow for the use of any suitable grease injection pump for filling the reservoir 16 with grease or other lubrication fluid.

The second part 0-2 of the generally L-shaped opening 0 is actually L-shaped itself. The opening 0-2 is provided by L-shaped edges formed in the front and rear walls 18a and 18c. The front wall 18a includes a vertical edge portion 30a which is alignable with the vertical edge portion 21c of the front wall 17a of the first protective section 17. The front wall 18a of the second protective section 18 further includes a horizontal edge 30b which intersects the vertical edge 30a at a right angle. A first angle member 31 is welded at the vertical edge 21c of the first protective section front wall 17a. And, a second angle member 32 is welded onto the vertical edge section 30a of the second protective section front wall 18a so that the flanges of the angle members 31 and 32 are aligned to provide a common abutment face for engaging the side wall 12a of second gear housing 12. A third angle member 33 is welded onto the horizontal edge section 30b for engaging in part an outside portion of the lower or bottom side 12b of the second gear housing 12.

The rear wall 18c includes a vertical edge portion 34a which intersects a horizontal edge portion 34b to provide a L-shaped edge which is aligned with the corresponding L-shaped edge provided by edges 30a and 30b in the front wall 18a. Finally, the second outer rim portion includes an upper end edge 35 which is aligned with the horizontal edges 30b and 34b to also engage the bottom side member 12b of the second gear housing 12.

In the preferred embodiment of this invention, the generally semi-circular shape of the front wall 18a includes a tangential extension section 38a which is formed by the horizontal edge 30b and by a tangential extension 38b of the outer generally semi-circular edge 26a of the front wall 18a of the second protective section 18. Similarly, the rear wall 18c includes a tangential extension section 29 formed by the horizontal edge 34b and a tangential extension 39a of the outer rear wall edge 27a. This tangential extension section allows the horizontal length of the edges 30b and 34b of the front and rear walls 18a and 18c, respectively, to be longer thus providing a landing ledge to abut the bottom second housing side 12b. Referring to FIG. 1, it is again noted that the opening 14 formed by the second housing side walls 12a and 12b is actually L-shaped itself and therefore, it is necessary for the horizontal length of the ledge provided by edges 30a and 34a to be sufficiently long to engage the bottom side wall 12b of the housing 12 in an area beyond the edge 12e which identifies one end of the recess in the side wall members 12a and 12b which provide the L-shaped opening 14. In this manner, the L-shaped opening 0 is formed by the combination of the openings 0-1 and 0-2 in the first and second protective sections 17 and 18, respectively. The opening 0 is adapted to be aligned with the L-shaped opening 14 in the second housing 12 in order to allow for rotation of the gear tooth portion of the gear G-1 within the housing 12 in meshing engagement with the gear G-2.

Referring to FIGS. 1 and 6, the connection means generally designated as 19 further includes the angle member 40 mounted adjacent to the diagonal edge 26b of the second protective section front wall 18a in a position such that outwardly extending flange portion 40a of the angle 40 is aligned with the top diagonal edge 26b. In this manner, when the first and second protective sections 17 and 18 are joined together, the flange portions 25a and 40a abut such that bolt assemblies 41 may be mounted in aligned openings in the flange portion 25a and 40a thus providng the connection means 19 which connect together the first protective section 17 and second protective section 18.

There have been a number of semi-circular peripheral edges described. For example, the outer edge 21 of the front wall 17 is generally semi-circular and may be defined as being generated by a radius r rotated about a center point 42. The outer semi-circular peripheral edge 22a of the rear wall 17c has the same radius and similarly, the curvature of the outer rim 17b has substantially the same radius, also. That same radius r provides the peripheral edges 26a on the front wall 18a of the second protective section 18, the same radius r generating the outer edge 27a of the rear wall 18c. Of course, the tangential section formed by wall portions 38a and 39 are not generated along the radius r, but rather, may be defined as generated in an approximately tangential direction to the radius r to that side of the protective device sections 17 and 18. The center of all of these outer peripheral edges defined as being generally semi-circular is common at point 42. An opening may also be provided about point 42, such opening, identified as 43, being provided to allow for a spindle or other center extension of the gear G-1 or gear shaft 11.

The mount means previously identified as 20 is provided for attaching the joined first and second protective sections 17 and 18 to the motor housing wall 10. The mount means 20 includes a plurality of sets of circumferentially spaced first and second connector members 45 and 46 spaced about the first and second rim portions 17b and 18b. Connector members 45, which are L-shaped angle members, are each welded onto the outer rims 17b and 18b and extend rearwardly and include a portion 45a which extends rearwardly beyond the rim edges. The angle portion 45a extends rearwardly a distance equal to the width of the spacer rim 23 so that the end of each of the connector member portions 45a is substantially adjacent to the motor housing wall 10. The mount means 20 further includes a plurality of two second connector members 46, which are also L-shaped angles, which are adapted to be welded or otherwise attached to the motor housing wall 10 at circumferentially spaced intervals for alignment with an abutment against the angle member end portions 45a. The connector members 46 are positioned such that one flange 46a thereof is adapted to align with and mate against a flange 45b on each of the extended portions 45a of the connector members 45 so that bolt assemblies 47 may extend through openings aligned in the oppositely facing faces of flanges 46a and 45b.

In operation and use, the protective sections 17 and 18 are mounted over the gear G-1 and the flange faces 25a and 40a are connected together by bolt assemblies 41 of the connection means 19. In making such mounting, this first protective section 17 is mounted over the first gear G-1 and the connector 45 on rim 17b are aligned with and bolted to connector 46. The second section 18 then positioned under the first section 17 and the rim 18b is aligned by engagement against alignment member 24. The connector members 45 on rim 18b are then aligned with the connector members 46 attached to the motor housing wall 10 in order to receive bolts for actually bolting the connected sections 17 and 18 to the housing wall 10. The L-shaped opening 0 provided by opening portions 0-1 and 0-2 of the joined protective sections 17 and 18 is aligned with the opening 14 in the second gear housing 12 in order to allow the gear G-1 to engage the gear G-2 within the confines of the second gear housing 12. The vertical edges 21c and 22c of the front and rear walls 17a and 17c, respectively, of the first protective section 17, actually abut against and engage the second housing side wall 12a. Similarly, the horizontal edges 30b and 34b of the front and rear walls 18a and 18c, respectively, of the second protective section 18, engage the bottom side wall 12b. In this manner, the gear G-1 is allowed to rotate within the housing 12 for the gear G-2 and lubrication fluid which may be splashing is held within the confines of the reservoir 16.

The foregoing disclosure and description of the invention are illustrative and explanatory thereof, and various changes in the size, shape and materials as well as in the details of the illustrated construction may be made without departing from the spirit of the invention. The disclosure has been directed to a particular environment, the protective section of an otherwsie exposed gear which forms part of a rack assembly on an offshore oil well platform and which gear must mesh with a gear positioned in a housing. It should be understood that the protection device of this invention may have application in other environments where gear protection is needed.

I claim:

1. On an offshore oil well drilling vessel including a drilling platform supportable on a plurality of extendable legs, wherein each leg is moved by a rack gear assembly which includes an otherwise exposed first gear which engages a second gear positioned in a housing, protective device, comprising:
   first and second protective sections adapted for mounting over such first gear, which is mounted on a shaft extending through a back wall, said protective sections being adapted for mounting adjacent to second gear housing, which second gear housing includes an opening on one corner thereof in which opening is positioned a portion of such first gear for meshing engagement with said second gear;
   said first protective section being generally semi-circular in configuration and including front and rear walls connected by a first arcuate rim to form a generally semi-circular configuration, said front and rear walls and first rim having edge portions cooperating to form a first cover section opening;
   said second protective section being generally semi-circular in configuration and including front and rear walls connected by a second arcuate rim to form a generally semi-circular configuration, said front and rear walls and second rim having edges cooperating to provide a second cover section opening for cooperating with said first cover section opening to provide an L-shaped opening to be positioned adjacent to the corner opening of such second gear rectangular housing;
   protective section connection means mounted with said first and second cover sections for connecting said cover sections together over the first gear; and
   mount means for mounting said first and second protective sections onto such first gear back wall.

2. The structure set forth in claim 1, wherein said protective section connection means includes:
   said front wall of each of said generally semi-circular protective sections including a diagonal edge having an elongated flange, which flanges are connected together to connect said first and second protective sections together.

3. The structure set forth in claim 1, wherein said mount means includes:
   a plurality of first connector members being mounted on said first and second rim portions at circumferentially spaced points, said first connector members extending transversely across said first and second rims and extending rearwardly from said rear wall portion;
   a plurality of second connector members adapted for attachment to such back wall for said first gear in circumferential positions for alignment with said first connectors; and
   bolt means for connecting aligned first and second connector members together.

4. The structure set forth in claim 3, wherein:
   said first and second connector members are L-shaped angles aligned for engagement on oppositely facing surfaces.

5. The structure set forth in claim 1, wherein:
   said edge portions of said front and rear walls and said first rim of said first protective section which form said first cover section opening being in the same plane; and
   said edge portions of said front and rear wall of said second protective section having first and second segments at right angles to form an L-shaped opening adapted to engage the corner of such second gear housing.

6. The structure set forth in claim 1, including:
   said front wall of said first protective cover section being generally semi-circular in configuration;
   said rear wall of said first protective cover section being annular in configuration; and
   a spacer rim portion connected to said annular rear wall portion and being adapted to be positioned adjacent to the back wall.

7. The structure set forth in claim 6, wherein said mount means includes:
   a plurality of first connector members being mounted on said first and second rims at circumferentially spaced points, said first connector members extending transversely across said first and second rim portions and extending rearwardly from said rear wall portion;
   a plurality of second connector members adapted for attachment to such back wall for said first gear in circumferential positions for alignment with said first connectors;
   bolt means for connecting aligned first and second connector members together; and
   said spacer rim portion and said second connector member having substantially the same thickness.

8. The structure set forth in claim 1, including:
   said front wall of said second protective section being generally semi-circular in configuration; and
   said rear wall of said second protective section being generally annular in configuration and cooperating with said front wall and said second rim portion to form a grease reservoir through which said first gear is rotated to be continually lubricated.

9. The structure set forth in claim 1, including:
   an alignment member attached to said first rim of said first protective section and extending diagonally to engage said second rim portion of said second protective section for alignment of the protective sections for connection together.

* * * * *

UNITED STATES PATENT AND TRADEMARK OFFICE
CERTIFICATE OF CORRECTION

PATENT NO. : 4,305,686
DATED : December 15, 1981
INVENTOR(S) : James M. Magill

It is certified that error appears in the above-identified patent and that said Letters Patent are hereby corrected as shown below:

In column 2, line 60, delete "inclues" and insert --includes--.

In column 3, line 28, delete "s" and insert --is--.

In column 3, line 47, delete "gear" and insert --rear--.

In column 4, line 26, delete "parellel" and insert --parallel--.

In column 4, line 48, delete "infra" and insert --*infra*--.

In column 5, line 30, delete "29" and insert --39--.

In column 5, line 40, delete "30a" and insert --30b--.

In column 7, line 10, delete "otherwsie" and insert --otherwise--.

Signed and Sealed this

Eighteenth Day of May 1982

[SEAL]

Attest:

Attesting Officer

GERALD J. MOSSINGHOFF
*Commissioner of Patents and Trademarks*